United States Patent
Coen

(10) Patent No.: US 8,401,837 B2
(45) Date of Patent: Mar. 19, 2013

(54) EFFICIENT TEXT DISCRIMINATION FOR WORD RECOGNITION

(75) Inventor: Gary A. Coen, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 649 days.

(21) Appl. No.: 12/625,009

(22) Filed: Nov. 24, 2009

(65) Prior Publication Data

US 2011/0125484 A1    May 26, 2011

(51) Int. Cl.
*G06F 17/28* (2006.01)
(52) U.S. Cl. .......................................... 704/3
(58) Field of Classification Search ........................ 704/3
See application file for complete search history.

(56) References Cited

U.S. PATENT DOCUMENTS

2003/0120947 A1    6/2003  Moore et al.
2009/0077617 A1    3/2009  Levow et al.

OTHER PUBLICATIONS

Whistler et al., "Unicode Character Encoding Model" Unicode Technicla Report #17, pp. 1-28, 2008, retrieved Oct. 8, 2009 http://unicode.org/reports/tr17/.
"The Open Group Base Specifications Issue 6, IEEE Std 1003.1, 2004 Edition", The IEEE and the Open Group, retrieved Oct. 8, 2009, pp. 1-6 http://www.opengroup.org/onlinepubs/009695399/utilities/uuencode.html.
"The text in a newsgroup message or in an e-mail message is incorrectly interpreted as a blank attachment" Microsoft Outlook Express, 2006. Article ID: 898124—Last Review: Oct. 11, 2006—Revision: 3.3. retrieved Oct. 8, 2009 at http://support.microsoft.com/default.aspx/kb/898124.
EP Search Report for application EP10251480 dated Feb. 3, 2011.

*Primary Examiner* — Susan McFadden
(74) *Attorney, Agent, or Firm* — Yee & Associates, P.C.

(57) ABSTRACT

The different advantageous embodiments provide a system for text discrimination comprising a word recognizer and control logic. The word recognizer has language data compiled using a number of finite state automata. The control logic is configured to operate the word recognizer to accept or reject a number of characters as a word.

17 Claims, 10 Drawing Sheets

Sound Classification Database
700

Relative sound classification

| Sound Segment Class | Character Sequence Members | Sonority Classification |
|---|---|---|
| Vowel | a, e, i, o, u | 11 |
| Glide | y, w | 10 |
| Rhotic approximant | wr, rh | 9 |
| Lateral approximant | r, l | 8 |
| Nasal A | m, n | 7 |
| Nasal B | ng, gm, gn | 6 |
| Voiced fricative | v, z, j | 5 |
| Voiced stop | b, d, g | 4 |
| Voiceless fricative | f, h, th, s, sh | 3 |
| Voiceless affricate | ch, gh, ph, sch, tch, tz, wh, x | 2 |
| Voiceless stop | c, ck, ct, p, q, t, k | 1 |

704 706 708 → 702

Regular expressions for relative sound classifications

| Sound Segment Class | Regular Expression | Regular Expressions Sonority Classification |
|---|---|---|
| Vowel | a\|e\|i\|o\|u | C11 |
| Glide | y\|w | C10 |
| Rhotic approximant | wr\|rh | C9 |
| Lateral approximant | r\|l | C8 |
| Nasal A | m\|n | C7 |
| Nasal B | ng\|g[m\|n] | C6 |
| Voiced fricative | v\|z\|j | C5 |
| Voiced stop | b\|d\|g | C4 |
| Voiceless fricative | f\|(s\|t)h\|s | C3 |
| Voiceless affricate | [[c\|g\|p\|sc\|tc\|w]h\|tz\|x] | C2 |
| Voiceless stop | [c(k\|t)\|p\|q\|t\|k] | C1 |

Language Data 800
Number of finite state automata 802
804
806
Key 801: [ ]=subexpressions, ( )=optionality, | =union, ^{x,x}=iteration

| | Regular Expression | Word Examples |
|---|---|---|
| O1 | (s) C1 (C8) (C10) | cat, play, sclera, twin, try |
| O2 | C2 (C7\|C8) (C10) | child, gnome, phone, wry |
| O3 | C3 (C7\|C8) (C10) | flow, sylph, smug, thrip, thwack |
| O4 | C4 (C8) (C10) | being, bye, dye, dry, grow, gyre |
| O5 | C5 (C8) (C10) | jazz, vim, vraisemblance, zoos |
| O6 | C6 | gnarly, gnat, gnaw, gnome, gnu |
| O7 | C7 (C8) (C10) | me, myiasis, myotic, nye |
| O8 | C8 | rack, role, ruby, lady, lull, lupine |
| O9 | C9 | rhinoceros, rhubarb, wring, wry |
| O10 | C10 | yank, yes, yule, yurt, will, worst |
| K1 | C10 (C8) (C7) [C3\|C2\|C1] ^{1,2} (s) | awl, dough, eyry, growth, yawn |
| K2 | C10 (C8) C7 ^{1,2} (s) | awning, drowns, strewn |
| K3 | C10 C8 ^{1,2} | myrrh, platyrrhine, pyre, pyrrhic |
| K4 | C8 (C7) [C2\|[C3\|C1] ^{1,2}] (s) | alpha, larch, schmaltz, sylphs |
| K5 | C8 (C7) C4 ^{1,2} (s) | alb, bird, burgh, orb, pulgar, scold |
| K6 | C8 [C3\|C4] C1 ^{1,2} (s) | first, torsk, twelfth, width, whilst |
| K7 | C8 [C3\|C4] ^{1,2} (s) | albs, barbs, dwarfs, guild, petard |
| K8 | C8 ^{1,2} (s) | all, errant, jelly, larrup, nulls, well |
| K9 | C7 (C4) C1 ^{1,2} (s) | oink, length, strengths, thousandth |
| K10 | C7 C4 ^{1,2} (s) | bung, clang, lambda, sand, thumb |
| K11 | C7 [C3\|C2] (s) | bench, bumph, inch, larynx |
| K12 | C7 (C3) C1 ^{1,2} (s) | against, bunk, empty, pants, romp |
| K13 | C7 C3 ^{1,2} (s) | absinth, bumf, canst, tenth |
| K14 | C7 ^{1,2} | column, damn, hymn, inn, limn |
| K15 | C6 (C3) (s) | amongst, angst, dinghy, lengthen |
| K16 | C5 (C1) (s) | cozy, daze, eve, fez, hajj, nozzle |
| K17 | C5 ^{1,2} | buzz, fizz, frizz, jazz, navvy |
| K18 | C4 ^{1,2} (s) | add, babble, ebb, eggs, rubber |
| K19 | C3 C1 (s) | asp, bisque, drift, lisps, tusks |
| K20 | C3 ^{1,2} (s) | bluffs, chuff, golfs, gruff, mess |
| K21 | C2 (C1) (s) | ache, aitch, bush, cash, patch |
| K22 | C1 ^{1,2} (s) | acts, buck, check, receipts, tipple |
| ONSET | 0\|O1\|O2\|O3\|O4\|O5\|O6\|O7\|O8\|O9\|O10 | Any |
| RHYME | C11 ^{1,5} \| C10 | Any |
| CODA | K1\|K2\|K3\|K4\|K5\|K6\|K7\|K8\|K9\|K10\|K11\|K12\|K13\|K14\|K15\|K16\|K17\|K18\|K19\|K20\| (s) | Any |
| SYLBL | ONSET RHYME CODA | Any |
| WORD | SYLBL ^{1,8}   1-8 SYLLABLES | Any |

816 ONSET, 814 RHYME, 812 CODA, 810 SYLBL, 808 WORD

EFFICIENT TEXT DISCRIMINATION FOR WORD RECOGNITION

BACKGROUND INFORMATION

1. Field

The present disclosure relates generally to data processing systems and more particularly to cybersecurity using data processing systems. Still more particularly, the present disclosure relates to detection of malware packaged within network traffic as transfer encodings.

2. Background

Avionics refers to electronics used by aircraft, spacecraft, and satellites for communication, navigation, and other aviation operations and systems. Aircraft may often communicate with each other and ground crews using avionics over network environments. Aircraft systems can receive updates and instructions over network environments that affect the operation of an aircraft. The network environment used by aircraft systems and avionics must be secure against undesired access and input.

Network security tools used in data processing systems generally use virus checking tools, such as signature-based filters, which are capable of identifying transfer encodings embedded in electronically formatted texts. These tools provide security against known viruses, but are unable to provide reliable security against attacks which exploit commonplace transfer encodings. Transfer encodings are binary executable programs converted into alphabetic sequences using an encoder, such as a UNIX-to-UNIX encoder or uuencoder. Messages received in network traffic often include natural language text and non-text content. The non-text content may be ASCII encoding of binary data in UNIX-to-UNIX, MIME base64, or similar transfer encodings.

Therefore, it would be advantageous to have a method and apparatus that takes into account one or more of the issues discussed above, as well as possibly other issues.

SUMMARY

The different advantageous embodiments provide a system for text discrimination comprising a word recognizer and control logic. The word recognizer has language data compiled using a number of finite state automata. The control logic is configured to operate the word recognizer to accept or reject a number of characters as a word.

The different advantageous embodiments further provide a method for discriminating between linguistic and non-linguistic text. Input data is received. The input data is applied to a word recognizer one byte at a time. A total byte count of the input data is identified. The total byte count of the input data is assigned to a variable b. A total of whitespace delimited character sequences is identified in the input data. The total of whitespace delimited character sequences in the input data is assigned to a variable c. A total length of a longest whitespace delimited character sequence rejected as a non-word is identified. The total length of a longest whitespace delimited character sequence rejected as a non-word is assigned to a variable l. $R = v(\text{ceiling}(b-(c-1)/c)$ is calculated.

The different advantageous embodiments further provide a method for word recognition. Input data is received one byte at a time. A next allowable state is transitioned to using a first byte of input data received. A determination is made as to whether a next byte of input data is received. In response to a determination that the next byte of input data is received, a next allowable state is transitioned to using the next byte of input data received.

The different advantageous embodiments further provide a method for applying input data to a word recognizer. A first byte of the input data is applied to the word recognizer. A byte count is incremented by one. A determination is made as to whether there are remaining bytes of input data to apply. In response to a determination that there are remaining bytes of input data to apply, a determination is made as to whether a next byte of the input data is a white space character. In response to a determination that the next byte of the input data is not the white space character, the next byte of the input data is applied to the word recognizer and the byte count is incremented by one.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 7 is an illustration of a sound classification database in accordance with an advantageous embodiment;

FIG. 8 is an illustration of language data in accordance with an advantageous embodiment;

DETAILED DESCRIPTION

Figure 1:
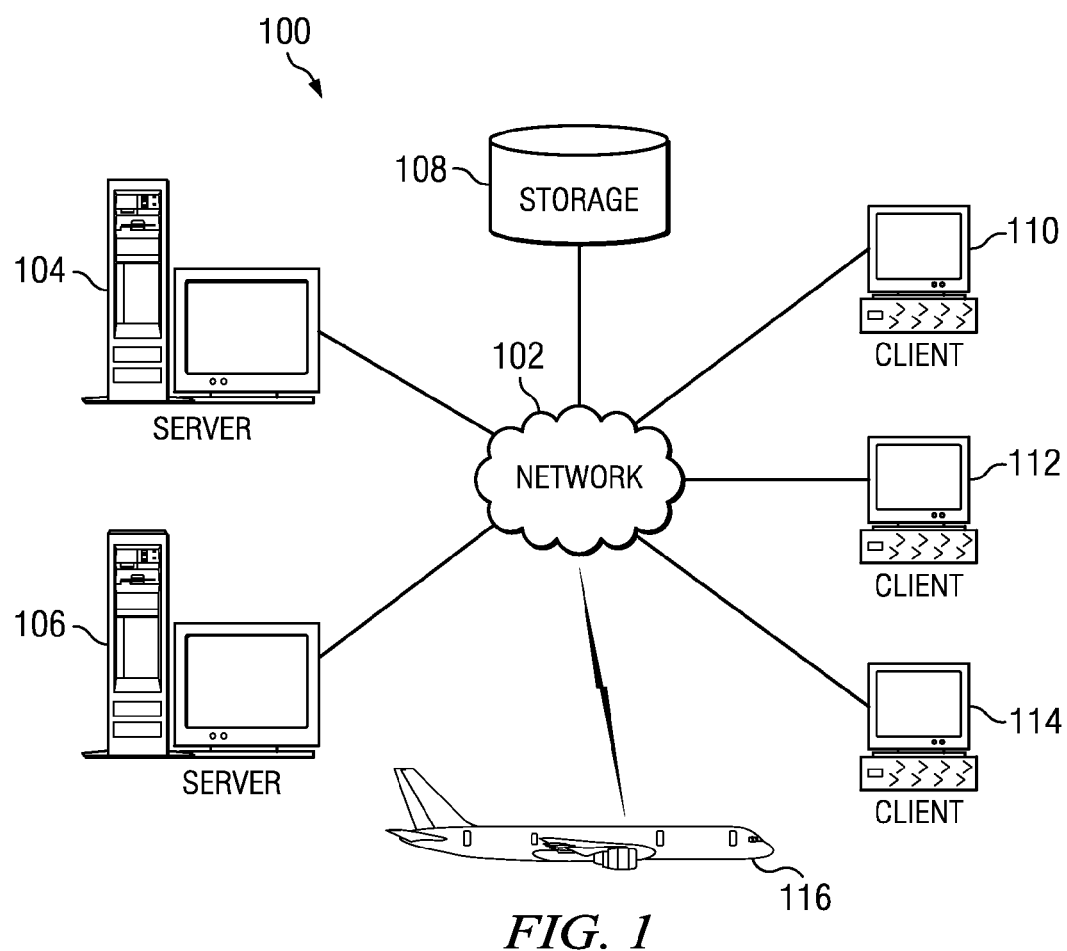
FIG. 1 is an illustration of a network of data processing systems in which the advantageous embodiments may be implemented.
Figure 2:
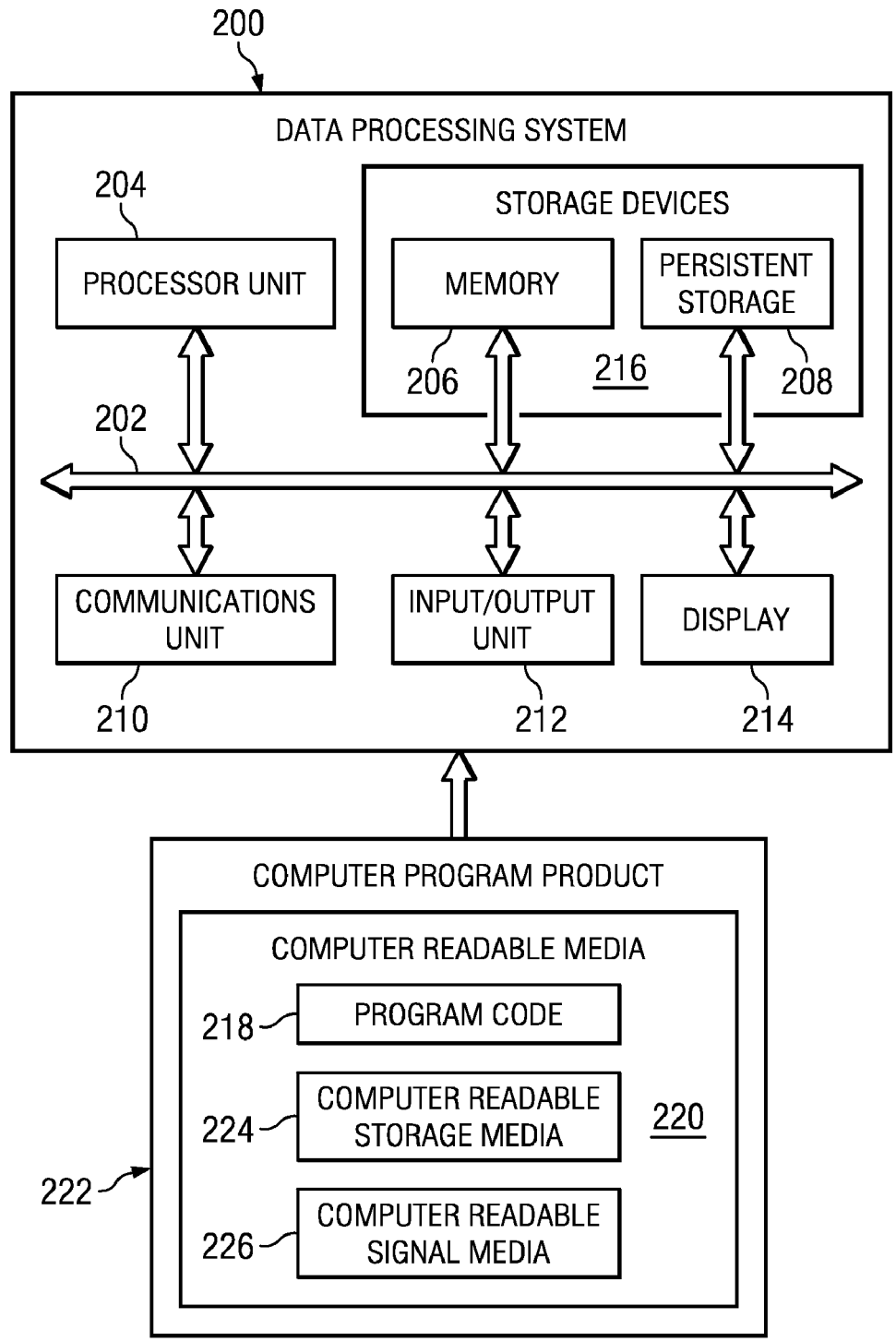
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, an illustration of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components, excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that current cybersecurity methods use signature-based filters capable of identifying transfer encodings embedded in electronically formatted texts. The current solutions provide security against known viruses, but fail to provide reliable security against attacks which exploit commonplace transfer encodings. Messages received in network traffic may include natural language text and non-text content. The non-text content may be ASCII encoding of binary data in UNIX-to-UNIX, MIME base64, or similar transfer encodings.

The different advantageous embodiments further recognize and take into account that transfer encodings can be a potential source of malware packaged within network messages in the form of non-linguistic textual content, such as binary data encoded in alphabetic sequences and intended for decoding back into binary form to produce an executable program. Some current antivirus software detects transfer encodings and look inside them for viruses matching known signatures. This approach does not protect against arbitrary novel malware programs packaged as transfer encodings and distributed in network messages, since no signatures yet exist for these programs.

Thus, one or more of the different advantageous embodiments provide a system for text discrimination comprising a word recognizer and control logic. The word recognizer has language data compiled using a number of finite state automata. The control logic is configured to operate the word recognizer to accept or reject a number of characters as a word.

The different advantageous embodiments further provide a method for discriminating between linguistic and non-linguistic text. Input data is received. The input data is applied to a word recognizer one byte at a time. A total byte count of the input data is identified. The total byte count of the input data is assigned to a variable b. A total of whitespace delimited character sequences is identified in the input data. The total of whitespace delimited character sequences in the input data is assigned to a variable c. A total length of a longest whitespace delimited character sequence rejected as a non-word is identified. The total length of a longest whitespace delimited character sequence rejected as a non-word is assigned to a variable l. $R=v(\text{ceiling}(b-(c-1)/c)$ is calculated.

The different advantageous embodiments further provide a method for word recognition. Input data is received one byte at a time. A next allowable state is transitioned to using a first byte of input data received. A determination is made as to whether a next byte of input data is received. In response to a determination that the next byte of input data is received, a next allowable state is transitioned to using the next byte of input data received.

The different advantageous embodiments further provide a method for applying input data to a word recognizer. A first byte of the input data is applied to the word recognizer. A byte count is incremented by one. A determination is made as to whether there are remaining bytes of input data to apply. In response to a determination that there are remaining bytes of input data to apply, a determination is made as to whether a next byte of the input data is a white space character. In response to a determination that the next byte of the input data is not the white space character, the next byte of the input data is applied to the word recognizer and the byte count is incremented by one.

Figure 3:
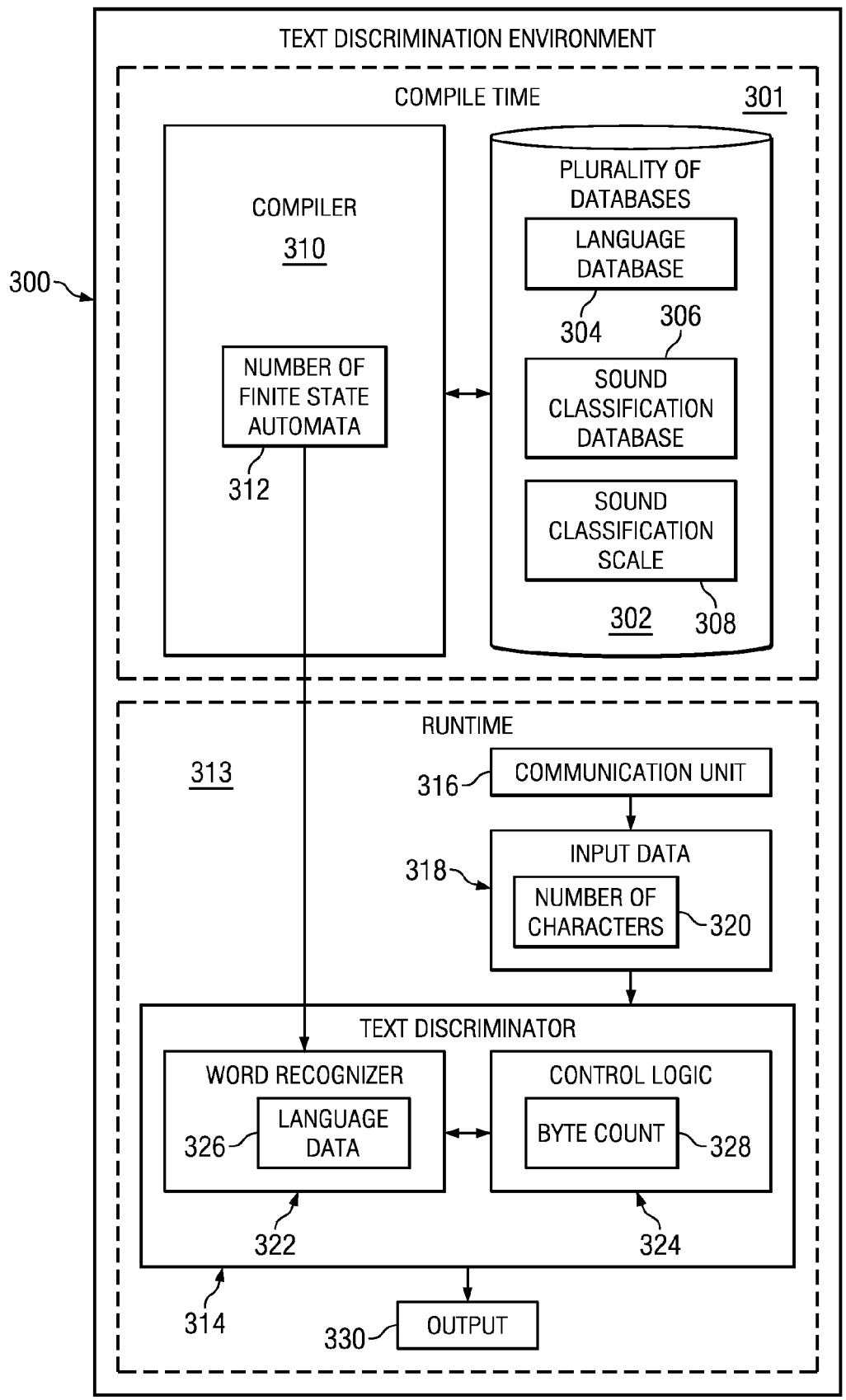
FIG. 3 is an illustration of a text discrimination environment in accordance with an advantageous embodiment.

With reference now to FIG. 3, an illustration of a text discrimination environment is depicted in accordance with an advantageous embodiment. Text discrimination environment 300 may be implemented in a network environment, such as network data processing system 100, in an illustrative example.

Text discrimination environment 300 may represent components used during compile time 301 and components used during runtime 313. During compile time 301, text discrimination environment 300 includes plurality of databases 302 and compiler 310. Plurality of databases 302 is a collection of information that may include, for example, without limitation, databases, tables, processes to access information, and/or any other suitable information. Plurality of databases 302 may include information on the classification of sounds in natural language, such as phonetics, sonorants, syllable structure, constraints, word structure, and/or any other information on natural language.

In this illustrative example, plurality of databases 302 includes language database 304, sound classification database 306, and sound classification scale 308. Language database 304 may correlate sequences of character classifications with word examples that instantiate the indicated patterned sequence, for use in identifying linguistic text in data input, for example. Sound classification database 306 may include a number of tables classifying sonority of characters and/or regular expressions related to sonority classifications for a number of characters, for example.

Sonority refers to a ranking of speech sounds based on amplitude. Sonorants are associated with a sonority hierarchy having a number of levels of sonority. Sonorants, such as vowels, liquids, glides, and nasals, contrast with essentially non-sonorant obstruents, such as plosives, fricatives, and affricates.

Nasal consonants are produced by allowing air to escape freely through the nose due to a lowered velum in the mouth. While the oral cavity still acts as a resonance chamber for the sound, the air does not escape through the mouth because it is blocked by the lips or tongue.

Sound classification scale 308 may represent the stress domains and/or constraints of a sound or phrase in a given language. Compiler 310 uses the information in plurality of databases 302 to generate number of finite state automata 312.

A finite state automaton is a state machine that models behavior of a finite number of states, transitions between those states, and actions. Actions may include an entry into the state and an exit of the state, for example. A finite state automaton may implement acceptors and recognizers, which produce an output in the form of acceptance or rejection of input to the machine. Each of the finite number of states are either accepting or not accepting. When all input is processed, if the current state is an accepting state, the input is accepted. In contrast, if the current state is not an accepting state when all input is processed, the input is rejected. The finite state automaton can define a language with every word accepted and without rejected words, for example. This language would be the language encoded in the finite state automaton.

Compiler 310 uses number of finite state automata 312 to generate a unified finite state automaton, such as word recognizer 322 of text discriminator 314. A unified finite state automaton is a compilation of number of finite state automata 312. A unified finite state automaton may represent the states, and paths or transitions between states, for a part or whole of a natural language component, such as a word, for example. In one illustrative example, a unified finite state automaton may represent a union of syllable onsets classified in plurality of databases 302.

During runtime 313, text discriminator 314 may receive input data 318 via communication unit 316 over a network, such as network 102 in FIG. 1, for example. Communication unit 316, in these examples, provides for communications with other data processing systems or devices. In these examples, communication unit 316 may be a network interface card. Communication unit 316 may provide communications through the use of either or both physical and wireless communications links. Communication unit 316 may serve as a portal to the main data communication bus of a data processing system associated with text discriminator 314, such as communications fabric 202 in FIG. 2, for example.

Input data 318 may be received through communication unit 316. Input data 318 may be any type of data stream passing through communication unit 316 to a data processing system, such as data processing system 200 in FIG. 2. Input data 318 may include, for example, without limitation, an American Standard Code for Information Interchange (ASCII) data stream. Input data 318 includes number of characters 320. Number of characters 320 may be, for example, without limitation, characters, character sequences, segments, alphanumeric characters, symbols, other coding characters, and/or any other suitable character.

Text discriminator 314 receives input data 318 via communication unit 316 and uses word recognizer 322 with control logic 324 to discriminate between linguistic input and non-linguistic input. Linguistic input refers to natural language text. Non-linguistic input refers to any non-text content such as, for example, without limitation, ASCII encoding of binary data in UNIX-to-UNIX, MIME base64, and/or similar transfer encodings.

Word recognizer 322 is a compilation of number of finite state automata 312 generated during compile time 301. Word recognizer 322 operates using control logic 324 to distinguish between linguistic input and non-linguistic input, resulting in output 330.

Control logic 324 identifies byte count 328 of input data 318. Byte count 328 correlates with number of characters 320, where each character is one byte. Control logic 324 transfers one byte, or character, at a time to word recognizer 322. When control logic 324 identifies a white space character, or delimiter, control logic 324 asks word recognizer 322 to identify the current number of bytes, or characters, transferred to word recognizer 322 as a word or non-word. Control logic 324 may ask word recognizer 322 to identify with a yes/no response, where yes accepts the number of bytes, or characters, as a word, and no rejects the number of bytes as a non-word.

Control logic 324 may iteratively transfer one byte at a time to word recognizer 322, asking yes/no each time a white space character, or delimiter, is encountered, until the entire byte count 328 has been transferred to word recognizer 322. Control logic 324 will keep track of the number of accepted words and the length of character strings, or number of bytes, rejected as non-words. Control logic 324 identifies the length of the longest character string rejected as a non-word, and the total byte count 328. Text discriminator 314 then generates output 330.

Output 330 indicates that input data 318 is either linguistic input or non-linguistic input. If output 330 identifies input data 318 as linguistic input, input data 318 may be considered to contain only natural language text. If output 330 identifies input data 318 as non-linguistic input, input data 318 may be considered to contain at least some non-natural language text.

Word recognizer 322, operating with control logic 324, provides the ability to discriminate between natural language text and non-natural language text by recognizing syllables, words, and natural language constraints. Because a syllable is considered a linguistic universal, the syllable embodies general constraints on the distribution of sounds in natural languages, which can be used to identify words and natural language.

Figure 4:
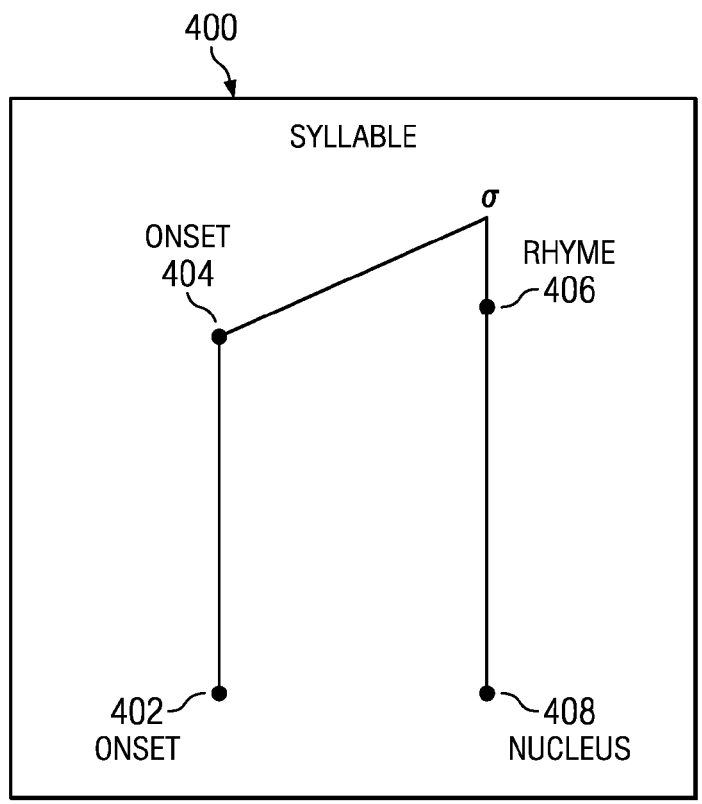
FIG. 4 is an illustration of a syllable in accordance with an advantageous embodiment.

With reference now to FIG. 4, an illustration of a syllable is depicted in accordance with an advantageous embodiment. Syllable 400 is an illustrative example of one implementation of a syllable structure classified in plurality of databases 302 in FIG. 3.

Syllable 400 includes onset 402, onset 404, rhyme 406, and nucleus 408. The number of syllables in a word generally coincides with the number of rhythmic units. The number of rhythmic units may be the equivalent of the number of vowels in a word, in one illustrative example. Syllable 400 may represent a set of constraints on the distribution of sound in natural language, for example.

Syllable 400 includes rhyme 406 composed of nucleus 408. Nucleus 408 includes a sonorant quality. A sonorant is a speech sound that is produced with a vocalic resonance in the vocal tract. Sonorants, such as vowels, liquids, glides, and nasals, contrast with essentially non-sonorant obstruents, such as plosives, fricatives, and affricates, for example. Relative sonority is related to syllable structure. The peak, or nucleus 408, of syllable 400 is always the most sonorant element. The onset tends to increase in sonority monotonically towards nucleus 408 and a coda tends to decrease monotonically in sonority away from nucleus 408. Sonorants are associated with a sonority hierarchy having a number of levels of sonority. The sonority hierarchy is a ranking of speech sounds based on resonance amplitude.

Onset 404 is a structural sister to rhyme 406. Together, onset 404 and rhyme 406 comprise the principle constituents of syllable 400. Onset 404 begins with onset 402. Onset 402 is the segment of syllable 400 prior to the principal vocalic nucleus, such as nucleus 408 for example.

The illustration of syllable 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
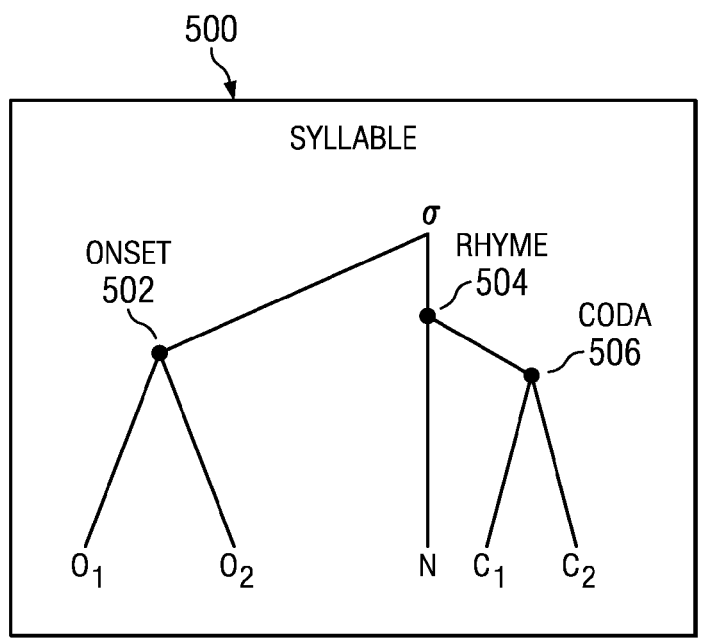
FIG. 5 is an illustration of a syllable in accordance with an advantageous embodiment.

With reference now to FIG. 5, an illustration of a syllable is depicted in accordance with an advantageous embodiment. Syllable 500 is an illustrative example of one implementation of a syllable structure classified in plurality of databases 302 in FIG. 3.

Syllable 500 includes onset 502, rhyme 504, and coda 506. Syllable 500 contains additional sound segments to that of syllable 400. Coda 506 is the additional sound segment for syllable 500. Coda 506 is a daughter constituent of rhyme 504.

The illustration of syllable 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
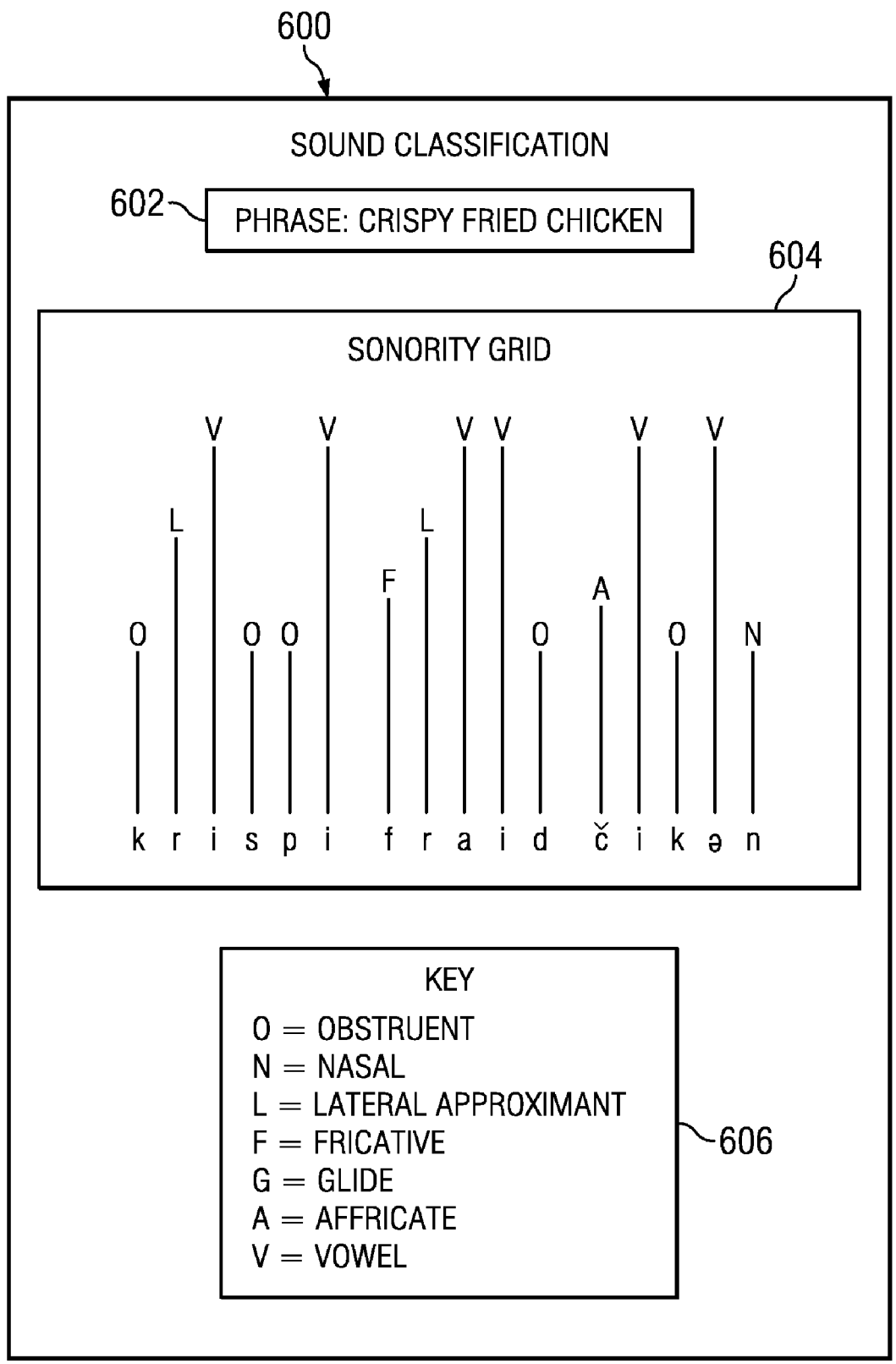
FIG. 6 is an illustration of a sound classification scale in accordance with an advantageous embodiment.

With reference now to FIG. 6, an illustration of sound classification is depicted in accordance with an advantageous embodiment. Sound classification 600 is an illustrative example of one application of information stored in plurality of databases 302 in FIG. 3, such as sound classification scale 308, for example. Sound classification 600 is also an illustrative example of one application of information compiled into word recognizer 322 in FIG. 3, and used alongside control logic 324 to discriminate between linguistic and non-linguistic text.

Phrase 602 is provided for illustrative purposes. Phrase 602 is "crispy fried chicken." In an illustrative example using phrase 602 to demonstrate, sound classification scale 600 represents the sonority of phrase 602 on sonority grid 604. Key 606 represents the sonority assignments depicted in sonority grid 604. Key 606 may also be compared to sound segment class 704 and 712 in FIG. 7, described in more detail below. The sonority constrained structure of stress domains in a word and/or phrase is a linguistic universal that compiler 310 in FIG. 3 can exploit when encoding formulae for syllables to be used to generate number of finite state automata 312.

The illustration of sound classification 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 7, an illustration of a sound classification database is depicted in accordance with an advantageous embodiment. Sound classification database 700 is an illustrative example of a type of information stored in plurality of databases 302 in FIG. 3, such as sound classification database 306, for example. Sound classification database 700 is also an illustrative example of one application of information compiled into word recognizer 322 in FIG. 3, and used alongside control logic 324 to discriminate between linguistic and non-linguistic text.

Sound classification database 700 may include relative sound classification 702, regular expressions for relative sound classifications 710, and/or any other suitable information. In an illustrative example, relative sound classification 702 may correlate the sonority classification of ASCII characters and character sequences. Relative sound classification 702 may include categories such as, without limitation, sound segment class 704, character sequence members 706, sonority classification 708, and/or any other suitable categories, for example. In this illustrative example, relative sound classification 702 indicates that sound segment class 704 for a vowel is associated with character sequence members 706 "a, e, i, o, u" having a sonority classification of eleven.

Relative sound classification 702 may be used to distinguish between character sequences, such as in number of finite state automata 312 in FIG. 3, that instantiate syllables and those that do not. In an illustrative example, alphabetic character sequences such as ASCII binary data encodings are indifferent to phonetic constraints on stress domains, and relative sound classification 702 may be used to exploit this universal aspect of the human language sound system in order to discriminate between texts encoding human language messages and ASCII binary data encodings.

Regular expressions for relative sound classifications 710 may include categories for sound segment class 712, regular expression 714, and regular expressions sonority classification 716. Regular expressions for relative sound classifications 710 may be used to distinguish patterned behavior observed in syllable constituents of a given language. Regular expression 714 includes logical constants, such as characters for example, and operators that define string sets of operations, such as concatenation. Concatenation may refer to the operation of joining two character strings together end to end, such as joining "play" and "ground" to form "playground" for example. Regular expressions are a fundamental component of formal language theory. Regular expressions may be used in compilers, pattern matching, device drivers, and many other applications, for example.

In one illustrative example, regular expressions for relative sound classifications 710 indicates that sound segment class 712 for a voiceless stop is associated with regular expression 714 "[c(k,t) p, q, t, k]" having a regular expressions sonority classification 716 of C1. Here, regular expressions for relative sound classifications 710 indicates that a voiceless stop may begin with any of the associated regular expression consonants standing alone, or the letter "c" followed by either a "k" or a "t," in this illustrative example.

The illustration of sound classification database 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 8, an illustration of language data is depicted in accordance with an advantageous embodiment. Language data 800 is an illustrative example of one implementation of language data 326 in word recognizer 322 of text discriminator 314 in FIG. 3. Language data 800 supports operation of runtime word recognizer 322 in FIG. 3.

Language data 800 may represent one implementation of compiled sound classification information and word structure information from a number of finite state automata, such as number of finite state automata 312 compiled during compile time 301 and used to generate word recognizer 322 in FIG. 3. Key 801 illustrates that [ ]=subexpressions, ( )=optionality, |=union, and ^{x,x}=iteration in this illustrative representation of language data 800.

Number of finite state automata 802 represent compiled finite state automata, individually generated during compile time 301 in FIG. 3 and compiled into word recognizer 322 for use during runtime 313. Number of finite state automata 802 is associated with regular expression 804. Regular expression 804 may represent patterned behavior in natural language, or linguistic text, for example. In one illustrative example, word 808 is associated with any of one to eight syllables. Syllable 810 is further associated with any of an onset, rhyme, and coda. Coda 812, rhyme 814, and onset 816 have associated sonority classes and constituents represented under the column for regular expression 804.

Language data 800 also includes word examples 806. In this illustrative example, word examples 806 are customized for the English language. However, any number of different languages may be used to associate number of finite state automata 802 and regular expression 804 with word examples 806 for a given language.

Language data 800 may correlate regular expression 804 with word examples 806 that instantiate the indicated patterned sequence.

In an illustrative example, regular expression 804 indicates that finite state automaton O1 is composed of an optional "s" symbol, followed by any input acceptable to finite state automaton C1, followed optionally by any input acceptable to finite state automaton C8, followed optionally by any input acceptable to finite state automaton C10.

The illustration of language data 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
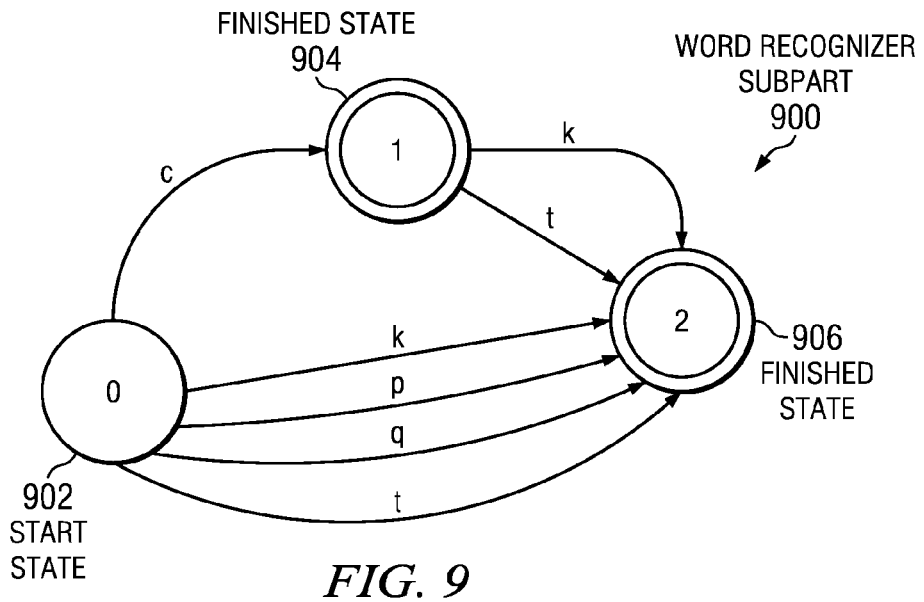
FIG. 9 is an illustration of a subpart of a word recognizer in accordance with an advantageous embodiment.

With reference now to FIG. 9, an illustration of a subpart of a word recognizer is depicted in accordance with an advantageous embodiment. Word recognizer subpart 900 is an illustrative example of one sub-operation of word recognizer 322 in FIG. 3. Word recognizer 322 may include any number of states, arcs, and transitions, up to hundreds of thousands in number, in order to recognize input data 318. Word recognizer subpart 900 is provided as an illustrative example of the operation of word recognizer 322 to transition between states and accept or reject character strings as words, for example.

In this illustrative example, word recognizer subpart 900 may represent sonority classification 1 for a voiceless stop under sonority classification 708 in FIG. 7. Word recognizer subpart 900 may include start state 902, finished state 904, and finished state 906. Start state 902 represents the beginning of a computation for text recognition. From start state 902, the computation proceeds based on the next input character, in this illustrative example. For example, if the next input character is the letter "c", the word recognizer subpart 900 moves to finished state 904. Finished state 904 may represent a syllable onset recognition. Word recognizer subpart 900 may stop at finished state 904, or continue on if the letter "k" or "t" is recognized, to successfully identify a different syllable onset once finished state 906 has been reached, in this example.

When word recognizer 322 in FIG. 3 does not have a transition arc out of a state, word recognizer 322 rejects the character string as a non-word, or answers "no" to control logic 324, for example. Control logic 324 may be, for example, an algorithm represented as:

$$R = v(\text{ceiling}(b-(c-l)/c)) \text{ where if } l > R, \text{ reject, otherwise, accept.}$$

Control logic 324 may assign the total byte count of the data input to variable b, the total whitespace delimited character sequences in the data input to variable c, and the character length of the longest whitespace delimited segment rejected as a non-word to variable l. R=any real number.

Figure 10:
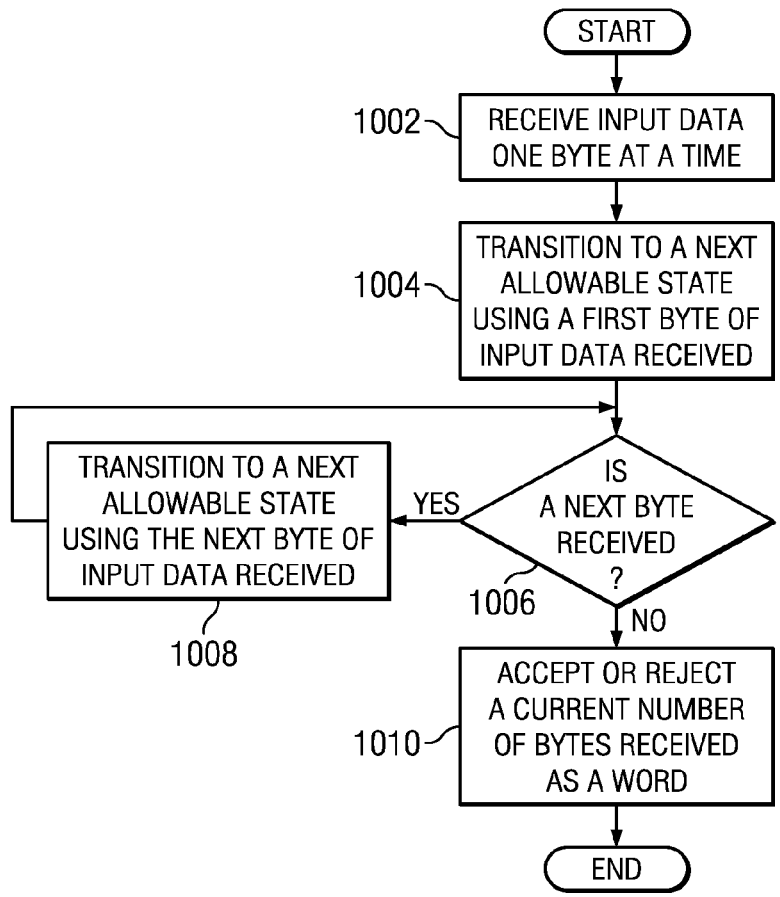
FIG. 10 is a flowchart illustrating a process for a word recognizer in accordance with an advantageous embodiment.

With reference now to FIG. 10, a flowchart illustrating a process for a word recognizer is depicted in accordance with an advantageous embodiment. The process in FIG. 10 may be implemented by a component such as word recognizer 322 in FIG. 3, for example.

The process begins by receiving input data one byte at a time (operation 1002). The input data may be, for example, input data 318 in FIG. 3, received via communication unit 316 and transferred by control logic 324 to word recognizer 322. The number of bytes of input data may correlate with a number of characters comprising the input data, for example, such as number of characters 320.

The process transitions to a next allowable state using a first byte of input data received (operation 1004). An allowable state may be any state connected to the current state of the word recognizer by a transition arc, for example. Word recognizer subpart 900 in FIG. 9 illustrates one example of two allowable states in finished state 904 and finished state 906, both of which are traversable by a number of transition arcs from start state 902, in one illustrative example. From start state 902 in FIG. 9, finished state 904 may be an allowable state if the first byte of input data is the character "c," in this illustrative example.

The process then determines whether a next byte of input data is received (operation 1006). If a determination is made that a next byte of input data is received, the process transitions to a next allowable state using the next byte of input data received (operation 1008), and returns to operation 1006. The process may iteratively perform operations 1006 and 1008 until a determination is made that a next byte of input data is not received.

If a determination is made that a next byte of input data is not received, the process accepts or rejects the current number of bytes received as a word (operation 1010), with the process terminating thereafter.

Figure 11:
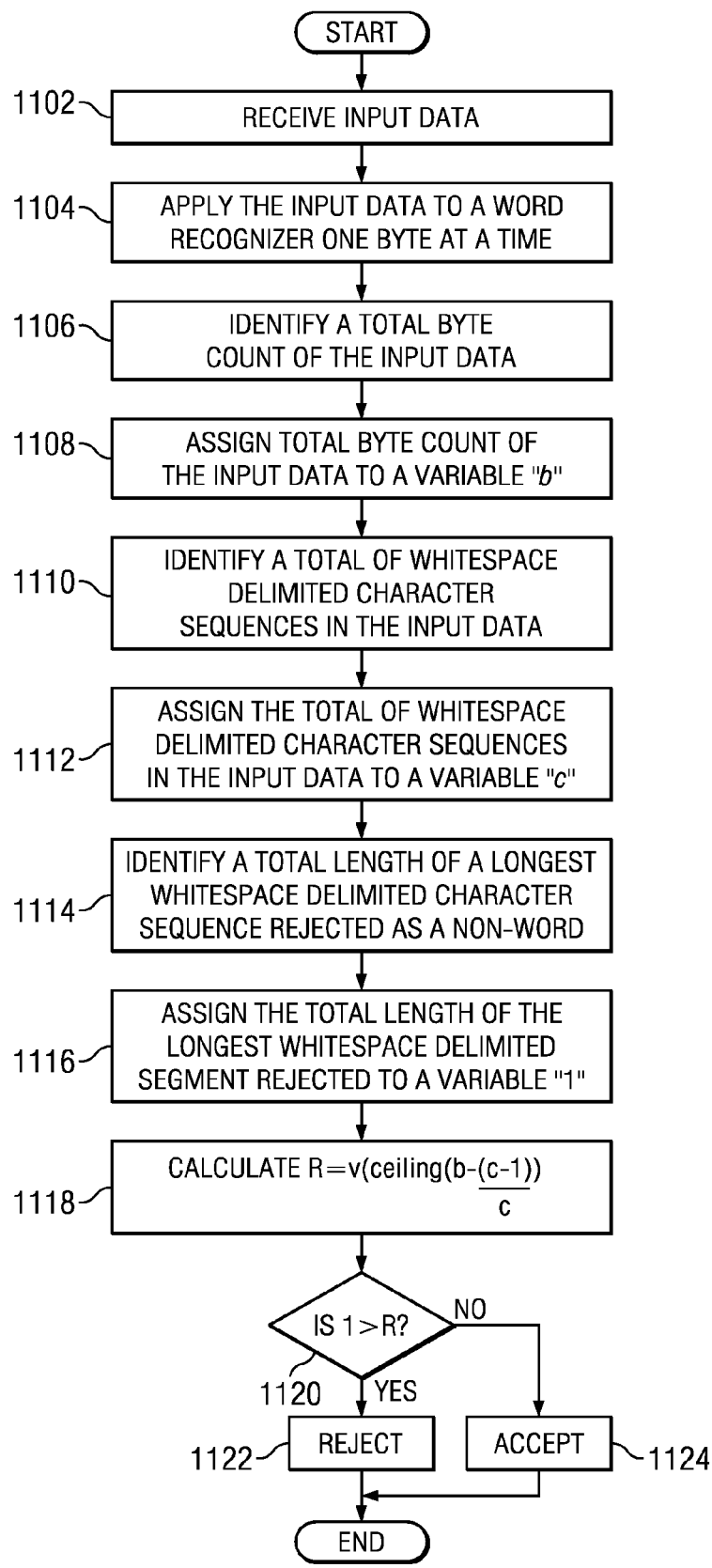
FIG. 11 is a flowchart illustrating a process for a text discriminator in accordance with an advantageous embodiment.

With reference now to FIG. 11, a flowchart illustrating a process for a text discriminator is depicted in accordance with an advantageous embodiment. The process in FIG. 11 may be an illustrative representation of control logic 324 in FIG. 3, for example.

The process begins by receiving input data (operation 1102). The input data may be received via a communications unit over a network environment, such as communication unit 316 in FIG. 3, for example. The process applies the input data to a word recognizer one byte at a time (operation 1104). The word recognizer may be, for example, word recognizer 322 in FIG. 3.

The process identifies a total byte count of the input data (operation 1106). The process then assigns the total byte count of the input data to a variable "b" (operation 1108). The process identifies a total of whitespace delimited character sequences in the input data (operation 1110). The process assigns the total of whitespace delimited character sequences in the input data to a variable "c" (operation 1112). The process then identifies a total length of a longest whitespace delimited character sequence rejected as a non-word (operation 1114). The process assigns the total length of the longest whitespace delimited segment rejected as the non-word to a variable of "l" (operation 1116). The process calculates R=v (ceiling(b−(c−l)/c)) (operation 1118). "V" is a pre-determined number summarizing experience with message data from a particular domain of application and its characteristic variation in word length, noise-to-signal ratio, and other factors established by empirical observation. The number of words is represented by "c." A length of the longest rejected non-word is represented by the letter "l." "R" is any real number, and "b" refers to the byte count of the input data.

The process determines whether l>R (operation 1120). If a determination is made that l>R, the process rejects the input data as containing at least some non-linguistic text (operation 1122). If a determination is made that l<R or l=R, the process accepts the input data as linguistic text (operation 1124), with the process terminating thereafter.

Figure 12:
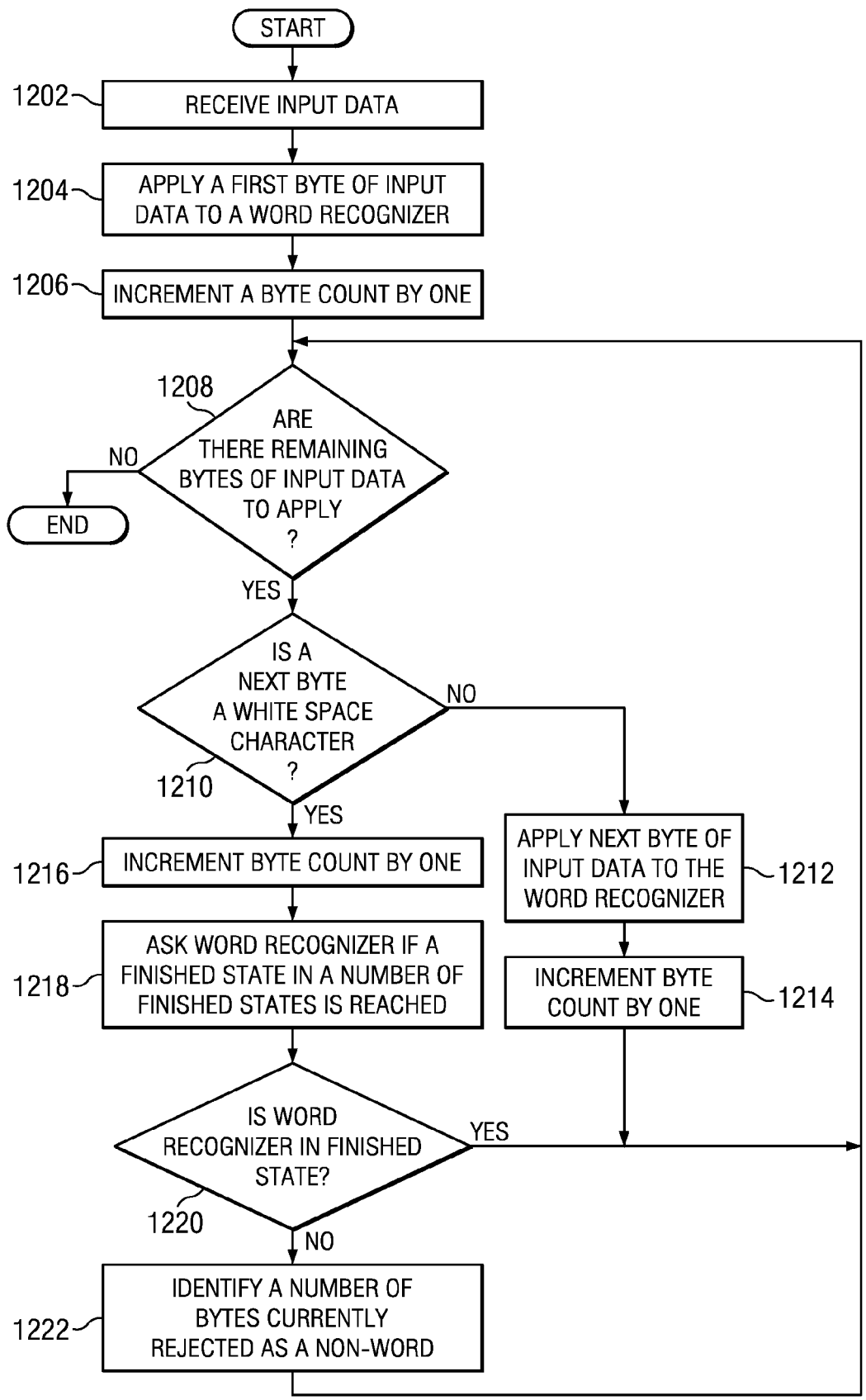
FIG. 12 is a flowchart illustrating a process for applying input data to a word recognizer in accordance with an advantageous embodiment.

With reference now to FIG. 12, a flowchart illustrating a process for applying input data to a word recognizer is depicted in accordance with an advantageous embodiment. The process in FIG. 12 may be implemented by a text discriminator, such as text discriminator 314 in FIG. 3, for example. The process begins by receiving input data (operation 1202). The process applies a first byte of input data to a word recognizer (operation 1204). The process then increments a byte count by one (operation 1206). Text discriminator 314 in FIG. 3 may maintain a byte count, such as byte count 328, of input data 318 applied to word recognizer 322 until input data 318 is exhausted, or no further characters remain to apply to word recognizer 322.

The process then determines whether there are remaining bytes of input data to apply (operation 1208). If a determination is made that there are remaining bytes of input data to apply, the process then determines whether a next byte is a white space character (operation 1210). If a determination is made that a next byte of input data is not a white space character, the process applies the next byte of input data to the word recognizer (operation 1212). The process then increments the byte count by one (operation 1214), and returns to operation 1208.

If a determination is made that a next byte of input data is a white space character, the process increments the byte count by one (operation 1216). The process then asks the word recognizer if a finished state in a number of finished states is reached (operation 1218). The process determines whether the word recognizer is in a finished state (operation 1220) based on the response from the word recognizer to the query in operation 1218.

A finished state indicates that a language component has been recognized. A language component may be, for example, without limitation, an onset, coda, rhyme, syllable, and word. In the illustrative example of FIG. 9, finished state 904 indicates a recognized voiceless stop, as identified in relative sound classification 702 in FIG. 7 for sonority class 1 and associated with regular expression sonority classification C1.

If a determination is made that the word recognizer is in a finished state, the process returns to operation 1208. If a determination is made that the word recognizer is not in a finished state, the process identifies a number of bytes currently rejected as a non-word (operation 1222), and then returns to operation 1208.

If, at operation 1208, a determination is made that there are no remaining bytes of input data to apply, the process terminates thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments provide a method for text discrimination. A data input is received. A byte count is identified for the input data. The input data is transferred to a word recognizer one byte at a time. A determination is made as to whether a white space character is identified. Responsive to a determination that the white space character is identified, a transferred number of bytes is accepted or rejected as a word. This word recognition procedure iterates until the entire text of a message is presented to the word recognizer, at which point a determination is made as to whether or not the message contains just text or as much as a single word of non-text.

The different advantageous embodiments provide a method for text discrimination. This method exploits the relationship between sound segments in the phonemic inventory and alphabetic symbols in the writing system to discriminate between texts with exclusively linguistic content and those with at least some non-linguistic content. The method provides an efficient security support for detection of malware packaged within messages as transfer encodings. The text discriminator recognizes natural language messages passing through the data stream and discriminates between messages which contain only natural language and those which contain non-text contents, such as transfer encodings.

The different advantageous embodiments can take the form of an entirely hardware embodiment, an entirely software embodiment, or an embodiment containing both hardware and software elements. Some embodiments are implemented in software, which includes, but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method for word recognition, the method comprising:
receiving, at a processor, input data one byte at a time;
transitioning, by the processor, to a next allowable state using a first byte of input data received;
determining, by the processor, whether a next byte of input data is received; and
responsive to a determination that the next byte of input data is received, transitioning, by the processor, to a next allowable state using the next byte of input data received.

2. The method of claim 1 further comprising:
responsive to a determination that the next byte of input data is not received, accepting or rejecting a current number of bytes received as a word.

3. The method of claim 1 further comprising:
iteratively determining and transitioning until a determination is made that the next byte of input data is not received.

4. The method of claim 1, wherein the input data comprises a number of characters, wherein each byte of input data correlates with a character in the number of characters, and wherein each character in the number of characters represents one byte.

5. The method of claim 1, wherein the input data is received over a communications unit in a network environment.

6. A method for discriminating between linguistic and non-linguistic text, the method comprising:
receiving, at a processor, input data;
applying, by a processor, the input data to a word recognizer one byte at a time;
identifying, by a processor, a total byte count of the input data;
assigning, by a processor, the total byte count of the input data to a variable b;
identifying, by a processor, a total of whitespace delimited character sequences in the input data;
assigning, by a processor, the total of whitespace delimited character sequences in the input data to a variable c;
identifying, by a processor, a total length of a longest whitespace delimited character sequence rejected as a non-word;
assigning, by a processor, the total length of a longest whitespace delimited character sequence rejected as a non-word to a variable l; and
calculating, by a processor, R=v(ceiling(b−(c−l)/c), wherein "R" is any real number.

7. The method of claim 6 further comprising:
determining whether l>R; and
responsive to l>R, rejecting the input data as containing at least some non-linguistic text.

8. The method of claim 7 further comprising:
responsive to l=R, accepting the input data as linguistic text.

9. The method of claim 7 further comprising:
responsive to l<R, accepting the input data as linguistic text.

10. A system for text discrimination, the system comprising:
a word recognizer comprising a processor configured to operate in conjunction with a non-transitory computer readable storage medium, the word recognizer having language data compiled using a number of finite state automata; and
control logic, stored on the non-transitory computer readable storage medium which, when executed by the processor, is configured to operate the word recognizer to accept or reject a number of characters as a word.

11. The system of claim 10, wherein the control logic further applies input data to the word recognizer one byte at a time until each byte of input data has been applied to the word recognizer.

12. The system of claim 11 further comprising:
output generated after the each byte of input data has been applied to the word recognizer, wherein the output identifies the input data as at least one of linguistic or non-linguistic text.

13. A method for applying input data to a word recognizer comprising a processor configured to operate in conjunction with a non-transitory computer readable storage medium, the method comprising:
applying a first byte of the input data to the word recognizer;
incrementing, by the word recognizer, a byte count by one;
determining, by the word recognizer, whether there are remaining bytes of input data to apply;
responsive to a determination that there are remaining bytes of input data to apply, determining, by the word recognizer, whether a next byte of the input data is a white space character;
responsive to a determination that the next byte of the input data is not the white space character, applying, by the word recognizer, the next byte of the input data to the word recognizer; and
incrementing, by the word recognizer, the byte count by one.

14. The method of claim 13 further comprising:
responsive to a determination that the next byte of the input data is the white space character, incrementing the byte count by one;
asking the word recognizer if a finished state in a number of finished states is reached; and
determining whether the word recognizer is in the finished state in the number of finished states.

15. The method of claim 14 further comprising:
responsive to a determination that the word recognizer is in the finished state, determining whether there are remaining bytes of the input data to apply.

16. The method of claim 14 further comprising:
responsive to a determination that the word recognizer is not in the finished state, identifying a number of bytes currently rejected as a non-word; and
determining whether there are remaining bytes of the input data to apply.

17. The method of claim 14, wherein the finished state indicates that a language component has been recognized, and wherein the language component is at least one of an onset, coda, rhyme, syllable, and word.

* * * * *